United States Patent [19]

Heseltine et al.

[11] 3,723,349
[45] Mar. 27, 1973

[54] THERMOCHROMIC COMPOSITION OF COBALT II CHLORIDE IN CURED POLYESTER

[75] Inventors: Robert William Heseltine, Aughton; John Burt Dawson, Ormskirk, both of England

[73] Assignee: Pilkington Brothers Limited, Liverpool, Lancashire, England

[22] Filed: Dec. 16, 1970

[21] Appl. No.: 98,937

[30] Foreign Application Priority Data

Dec. 19, 1969   Great Britain....................62,069/69

[52] U.S. Cl. ....................252/408, 252/300, 73/356, 260/863, 161/195
[51] Int. Cl............................G03b 5/22, G01k 11/12

[58] Field of Search ..260/863; 252/408, 300; 73/356

[56] References Cited

UNITED STATES PATENTS

| | | | |
|---|---|---|---|
| 3,449,276 | 6/1969 | Rabenold et al. | 260/22 |
| 3,297,788 | 1/1967 | Dun et al. | 260/863 |
| 3,061,580 | 10/1962 | Erickson et al. | 260/45.4 |
| 3,445,291 | 5/1969 | Stein | 136/83 |

*Primary Examiner*—George F. Lesmes
*Assistant Examiner*—Roland E. Martin, Jr.
*Attorney*—Sughrue, Rothwell, Mion, Zinn & Macpeak

[57] ABSTRACT

A thermochromic polymer composition is produced by incorporating a methanol solution of cobalt II chloride in an unsaturated polyester resin and then curing the resin without loss of volatiles.

9 Claims, No Drawings

3,723,349

THERMOCHROMIC COMPOSITION OF COBALT II CHLORIDE IN CURED POLYESTER

BACKGROUND OF THE INVENTION

1. Field of the Invention

This invention relates to thermochromic polymer compositions having reversible thermochromic properties; that is the color of the polymer deepens with increase in temperature, the color change being reversible so that it fades when the temperature falls to its original value.

2. Description of the Prior Art

It has been known to form a thermochromic polymer into a thin film and to protect that film from the atmosphere by some form of hermetic sealing. The known polymer compositions contain water and it has been found essential to maintain the water content of the polymer in order that the color change can continue to take place. In the known polymers the color change is observable when the temperature of the polymer is raised to about 70° C from room temperature and fades again when the temperature returns to room temperature.

SUMMARY

It has now been discovered that thermochromic polymer compositions can be produced which show a significant color change when the temperature of the polymer changes by only a small amount, e.g., within a range of 40° C, to produce a significant absorption of light but at a much lower temperature than those already mentioned, for example 40° C. This discovery employs an unsaturated polyester resin in which up to 10 percent by volume of a solution in an alcohol, preferably methanol, of cobalt II chloride is incorporated so that solution is trapped in the cured resin thus giving the whole of the polymer the new highly sensitive thermochromic properties.

DESCRIPTION OF THE PREFERRED EMBODIMENTS

In carrying out the invention polyester resins are used which form clear thermoplastic films, and suitable resins having this property are those known under the trade name CRYSTIC 191E and CRYSTIC 199, and FILABOND 1346. Slightly opaque thermochromic films are produced using cold curing acrylic resins such as those known by the trade name ACRULITE.

In one example of our invention, 50 ml of a polyester resin known by the trade name CRYSTIC 199 and 5 ml of a methanol solution (containing 0.1 M $CoCl_2$ and 0.4 M LiCl where M is g. moles/liter) were mixed thoroughly, 1.5 gm of a catalyst made by Scott Bader Ltd. and known as Catalyst Paste H (a paste dispersion of cyclohexanone peroxide) and 0.2 ml "A174 Silane" (Union Carbide) were dispersed in the mixture, and then 0.5 ml of an accelerator was added. The accelerator was supplied by Scott Bader Ltd. and is a solution of a cobalt soap known as Accelerator E (a solution of cobalt naphthanate).

The surfaces of two glass plates which surfaces were to be the inner surfaces of the laminate were primed with a methanol solution of a silane, e.g., Union Carbide A 174 silane to improve adhesion between the glass and the polymer. The plates were dried and one of the plates, with its primed surface uppermost was edged with a spacer strip of neoprene rubber 1 mm. or 2 mm. thick. The mixture was poured on to the glass plate and the second plate, with its primed face downwardly facing was lowered into position on the spacer. The plates were firmly clipped together and maintained horizontal for 12 hours at 30° C to cure the resin, after which time the plates were found to be firmly joined together by the polymer film formed. The glass sandwich formed appeared virtually colorless at 10° C deepening in color to blue at 40° C. It was found that such a glass sandwich could be heated repeatedly to 70° C without loss of the thermochromic nature of the polymer interlayer.

It is important when using a polyester resin containing monomeric styrene that when curing is carried out, all or substantially all of the monomeric styrene reacts during the curing to form a cross-linked structure as this material can interfere with the thermochromic process.

For example, where monomeric styrene is used, the method of the invention can be accomplished by forming the polyester resin by dissolving a condensation product of maleic or phthalic anhydride with a glycol in monomeric styrene, adding a solution of cobalt II chloride in methanol, and then curing by the addition of an organic peroxide catalyst and an accelerator while keeping the temperature sufficiently low to avoid evaporation of alcohol during the cure.

The concentration of the compounds dissolved in the non-aqueous solvent is chosen according to the degree of absorption required, and the thickness of the film formed, lower concentrations being possible in thicker films. We have varied e.g., cobalt II chloride concentrations in methanol from about 0.005 to 0.5 M for films having a thickness in the range 1 to 5 mm. Using an alkali metal chloride, e.g., lithium chloride or potassium chloride, as the source of halide ions, the amount present can be varied from 0 to about 0.8 M the greater the concentration of chloride ion $Cl^-$ the greater the magnitude of the color change.

Some concentrations of $Co^{II}$ and $Cl^-$ ions in the solution (in g. ions/liter), which give a good intensity change are set out in the following Table:

TABLE I

| Concentration g. ions/liter | | Color | |
|---|---|---|---|
| $Co^{II}$ | $Cl^-$ | 0°C | 60°C |
| 0.005 | 0.5 | pale pink-blue | blue |
| 0.05 | 0.4 | pale pink-blue | blue |
| 0.3 | 0.4 | pink-blue | blue |
| 0.4 | 0.2 | pink-blue | blue |

For example, according to the method of this invention, the method can comprise forming a methanol solution containing from 0.2 to 0.5 g. ions per liter of chloride ion $Cl^-$ and 0.005 to 0.4 g. ions per liter of cobalt II ion $Co^{II}$, as described in Table I above, adding 8 percent by volume of that solution to a styrene solution of an unsaturated polyester resin, and then curing the resin to give a cross-linked structure, without evaporation of the methanol employed in the solution.

Table II gives a number of further Examples 2 to 11 of thermochromic films prepared in the manner described above, which films are of different thicknesses, and contain differing amounts of cobalt II chloride solution in methanol. All the films formed gave a gradually increasing intensity of color, as the temperature rose from 10° to 40° C and could withstand higher temperatures up to 50° or 60° C without the color change being irreversible.

TABLE II

| Example | Resin | Resin (quantity) ml. | Catalyst (H) gm. | Accelerator (E) ml. | MeOH sol | | Film Thickness, mm. |
|---|---|---|---|---|---|---|---|
| 2 | 191E | 15 | 0.5 | 1.0 | 2.5 | 0.17 M CoCl₂ / 0.4 M LiCl₂ | 2 |
| 3 | 199 | 25 | 1.0 | 0.5 | 2 | 0.25 M CoCl₂ / 0.4 M LiCl | 4 |
| 4 | 199 | 25 | 1.0 | 1.0 | 1.5 | 0.25 M CoCl₂ / 0.8 M LiCl | ᵃ 3 |
| 5 | 199 | 75 | 3.0 | 2.5 | 4 | 0.25 M CoCl₂ / 0.8 M LiCl | ᵇ 1 |
| 6 | 199 | 50 | 2.0 | 1.0 | 5 | 0.08 M CoCl₂ / 0.4 M LiCl | ᵇ 1 |
| 7 | 196 | 25 | 1.0 | 0.5 | 2.5 | 0.2 M CoCl₂ / 0.2 M LiCl | ᵇ 1.5 |
| 8 | 199 | 15 | 1.5 | 1.0 | 2.5 | 1.0 M CoCl₂ / 0.4 M LiCl | 5 |
| 9 | 199 | 15 | 1.5 | 1.0 | 1.5 | 0.1 M CoCl₂ / 0.4 M LiCl | 5 |
| 10 | 199 | 15 | 1.5 | 1.0 | 0.5 | 0.1 M CoCl₂ / 0.4 M LiCl | 5 |
| 11 | 191E | 25 | 2.5 | 1.0 | 2.0 | 0.1 M CoCl₂ / 0.4 M LiCl | 5 |

ᵃ Polymer laminate.  ᵇ Glass laminate.

The polymer layers produced were found to be completely stable up to 60° C. In practice a temperature change of 0° to 40° C produced a most acceptable change in color and therefore increase in the absorption of white light.

As a further example of the invention for the production of a 2 mm. thick layer of the polymer in a glass laminate good results were achieved, for example by the incorporation of 8 ml of a methanol solution containing 0.3 g. ions/liter $Co^{II}$ and 0.4 g. ions/liter $Cl^-$, into 100 ml of either C199 or C191E resin and curing with 4 percent catalyst (cyclo-hexanone peroxide) and 2 to 4 percent accelerator (a solution of cobalt naphthanate). After the resin had been cured the white light transmission of the laminate was found to be 68 percent at 0° C and decreased linearly to 39 percent at 60° C. The color change from a pink color at 0° C to a blue color at 60° C was reversible, the rate of color change depending solely on the rate at which the polymer interlayer is heated or cooled.

Electrical heating means, for example electrical heating wires or an electrical heating film on one surface of the glass forming part of the laminate, could be employed for regulating the temperature of the polymer so that regulation of the current supplied by simple manual adjustment current control device was used to control accurately the color and white light transmission of the laminate.

When laminated between two sheets of transparent material — glass or transparent plastics material — the thermochromic polymer film is protected from water vapor.

Alternatively the film may be made water-repellant, or may be coated with a material which is impermeable or only very slightly permeable to water.

Such polymer films, whether laminated or not can be employed for improving the environment by reducing sunlight glare in buildings or vehicles. Sunlight falling on the film heats it to produce a thermochromic change in the film to increase white light absorbtion. By using electrical heating means as herein described environmental control is available to the occupant of a building or a vehicle.

We claim:

1. A method of forming a thermochromic polymer composition comprising forming a solution in an alcohol of cobalt II chloride and an alkali metal chloride, and incorporating up to 10 per cent by volume of that solution in an unsaturated polyester resin, and thereafter curing the resin to give a cross-linked polymer.

2. A method according to claim 1, wherein the alcohol is methanol.

3. A method according to claim 1, wherein the alkali metal chloride is lithium chloride.

4. A method according to claim 1, wherein the polyester resin is dissolved in monomeric styrene and gives a cross-linked structure when cured, without loss of volatiles.

5. A method according to claim 4, comprising forming the polyester resin by dissolving a condensation product of maleic or phthalic anhydride with a glycol in monomeric styrene, adding a solution of cobalt II chloride and an alkali metal chloride, and then curing by the addition of an organic peroxide catalyst and an accelerator while keeping the temperature sufficiently low to avoid evaporation of methanol during the cure.

6. A method according to claim 1, comprising forming a methanol solution containing 0.2 to 0.5 g. ions/liter of chloride ion $Cl^-$ and 0.005 to 0.4 g. ions/liter of cobalt II ion $Co^{II}$, adding 8 percent by volume of that solution to a styrene solution of an unsaturated polyester resin, and then curing the resin to give a cross-linked structure, without evaporation of methanol.

7. A thermochromic polymer composition comprising a polyester resin matrix formed by curing a mixture of an unsaturated polyester resin, said mixture having incorporated therein up to 10 per cent by volume of a solution in an alcohol of cobalt II chloride and an alkali metal chloride.

8. A composition according to claim 7, in which the alcohol is methanol and the alkali metal chloride is lithium chloride.

9. A composition according to claim 8, in the form of a sheet 2 mm thick, wherein said resin matrix has been cured with 4 percent by volume of a catalyst and 2 to 4 percent by volume of an accelerator, and 8 percent by volume of a methanol solution containing 0.3 g. ions/liter of cobalt II ion $Co^{II}$ and 0.4 g. ions/liter of chloride ion $Cl^-$ has been incorporated in the resin prior to curing, the white light transmission of which sheet is 68 percent at 0° C and decreases linearly to 39 percent at 60° C.

* * * * *